(12) United States Patent
Kovac

(10) Patent No.: US 7,806,633 B2
(45) Date of Patent: Oct. 5, 2010

(54) CUTTING INSERT WITH THREADED HOLE AND CUTTING TOOL THEREFOR

(75) Inventor: Jeffrey F. Kovac, Loyalhanna, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 12/041,920

(22) Filed: Mar. 4, 2008

(65) Prior Publication Data

US 2009/0226267 A1 Sep. 10, 2009

(51) Int. Cl.
*B23C 5/00* (2006.01)
*B23C 5/16* (2006.01)

(52) U.S. Cl. ..................... 407/113; 407/103

(58) Field of Classification Search ............... 407/103, 407/107, 113–116, 66, 67
See application file for complete search history.

(56) References Cited

U.S. PATENT DOCUMENTS

| | | | |
|---|---|---|---|
| 3,102,326 A * | 9/1963 | Conti et al. | 407/5 |
| 3,887,974 A * | 6/1975 | Sorice | 407/113 |
| 4,378,184 A | 3/1983 | Briese | |
| 5,893,401 A | 4/1999 | Eriksson | |
| 5,976,455 A | 11/1999 | Pantzar et al. | |
| 6,241,433 B1 * | 6/2001 | Rydberg et al. | 408/233 |
| 6,244,312 B1 | 6/2001 | Hoffman | |
| 6,273,650 B1 | 8/2001 | Jordberg | |
| 6,290,436 B1 * | 9/2001 | Qvarth | 407/113 |
| 6,834,692 B2 | 12/2004 | Lindsay et al. | |
| 6,941,635 B2 * | 9/2005 | Craven | 29/525.11 |
| 7,063,488 B2 * | 6/2006 | Isaksson et al. | 407/113 |
| 2002/0098047 A1 * | 7/2002 | Norris | 407/35 |
| 2004/0101373 A1 * | 5/2004 | Isaksson et al. | 407/103 |

* cited by examiner

*Primary Examiner*—Will Fridie, Jr.
(74) *Attorney, Agent, or Firm*—Larry R. Meenan, Esq.

(57) ABSTRACT

A cutting insert includes a top surface; a bottom surface; a plurality of clearance side surfaces extending between the top and bottom surfaces; a cutting edge formed at an intersection between the top surface and at least one of the plurality of clearance side surfaces; and a threaded hole extending from the bottom surface to a predetermined distance from the top surface. The threaded hole is capable of receiving an insert screw for mounting the cutting insert to a cutter body. A cutting tool for mounting the cutting insert to an insert-receiving pocket is also disclosed.

12 Claims, 5 Drawing Sheets

CUTTING INSERT WITH THREADED HOLE AND CUTTING TOOL THEREFOR

BACKGROUND OF THE INVENTION

The invention relates to a cutter having indexable cutting inserts for metal cutting operations.

Cutting inserts are mounted and held in cutting tools by a variety of methods, such as by screws, clamps, pins, and the like. Traditionally, screw-on cutting inserts are securely held to the tool holder body with an insert screw that passes through a hole formed in the insert and threads into the tool holder body. There have been times where the head of the insert screw would adversely affect chip flow due to its protrusion into the chip forming area of the cutter. Chips can deposit or pack in the screw socket and around the head of the screw, depending on the workpiece material and cutting conditions, making the screw difficult to remove. Also, if the insert screw was too long, the insert screw may protrude out the back of the cutter and rub on the workpiece during cutting operations. On small diameter cutters, the lack of thread engagement is also a concern.

Therefore, there is a need to provide a cutting insert that allows better chip flow by eliminating the possibility of the head of the mounting screw becoming a barrier to chip flow, and the need to tap the screw hold, thereby simplifying the manufacturing process and significantly reducing cycle times in the cutter.

BRIEF SUMMARY OF THE INVENTION

Briefly, according to this invention, there is provided a cutting insert having a central axis. The cutting insert includes a top surface; a bottom surface; a plurality of clearance side surfaces extending between the top and bottom surfaces; a cutting edge formed at an intersection between the top surface and at least one of the plurality of clearance side surfaces; and a threaded hole extending from a bottom surface to a predetermined distance from the top surface. The threaded hole is capable of receiving an insert screw for mounting the cutting insert to a cutter body.

In another embodiment, a cutting tool comprises a cutter body having an insert-receiving pocket for receiving a cutting insert. The cutting insert comprises a top surface, a bottom surface, a plurality of clearance side surfaces, a cutting edge formed at an intersection between the top surface and at least one of the plurality of clearance side surfaces, and a threaded hole extending from a bottom surface to a predetermined distance from the top surface, wherein the threaded hole is capable of receiving an insert screw for mounting the cutting insert to a cutter body.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
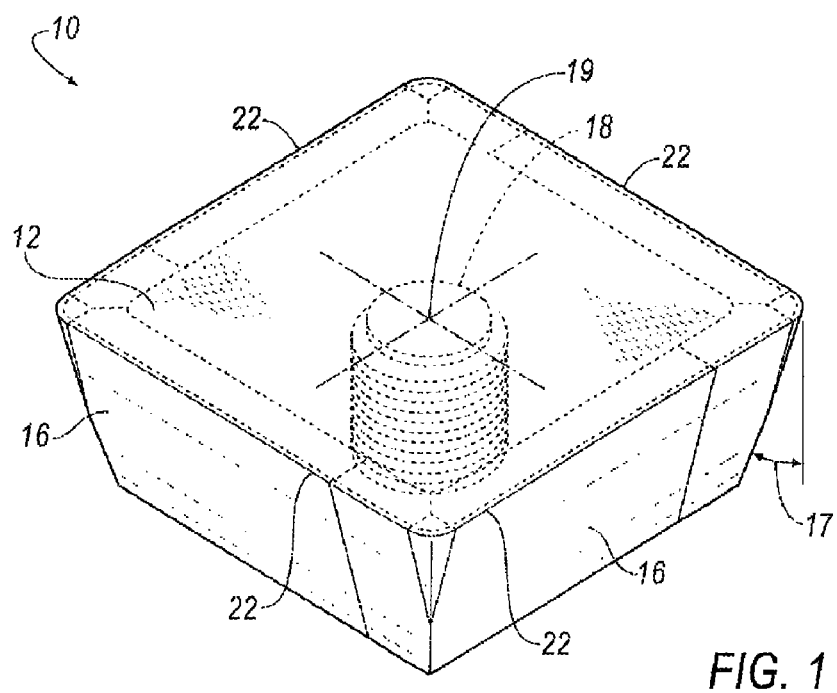
FIG. 1 is a perspective view of a cutting insert according to an embodiment of the invention.
Figure 2:
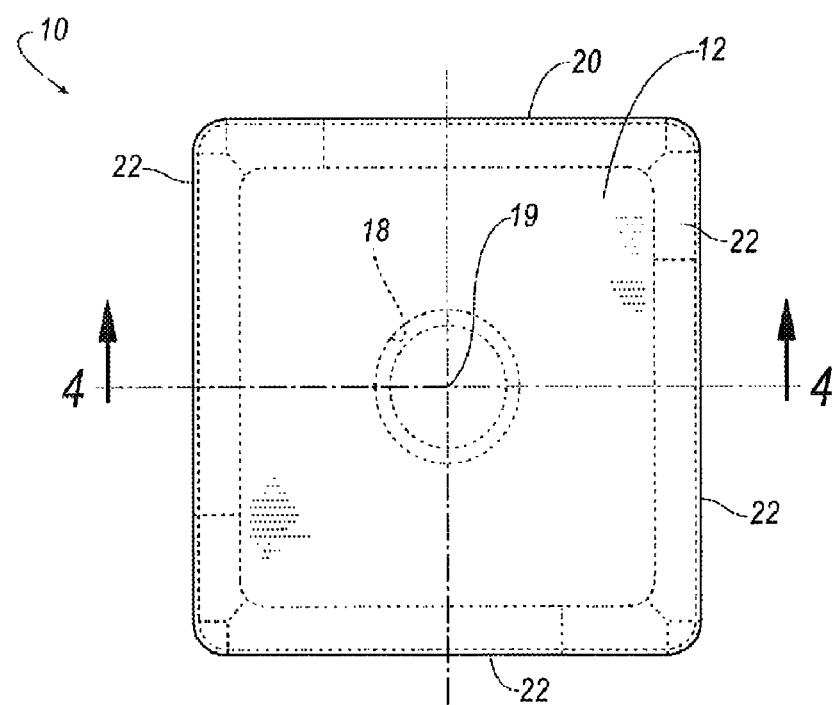
FIG. 2 is a top view of the cutting insert of FIG. 1.
Figure 3:
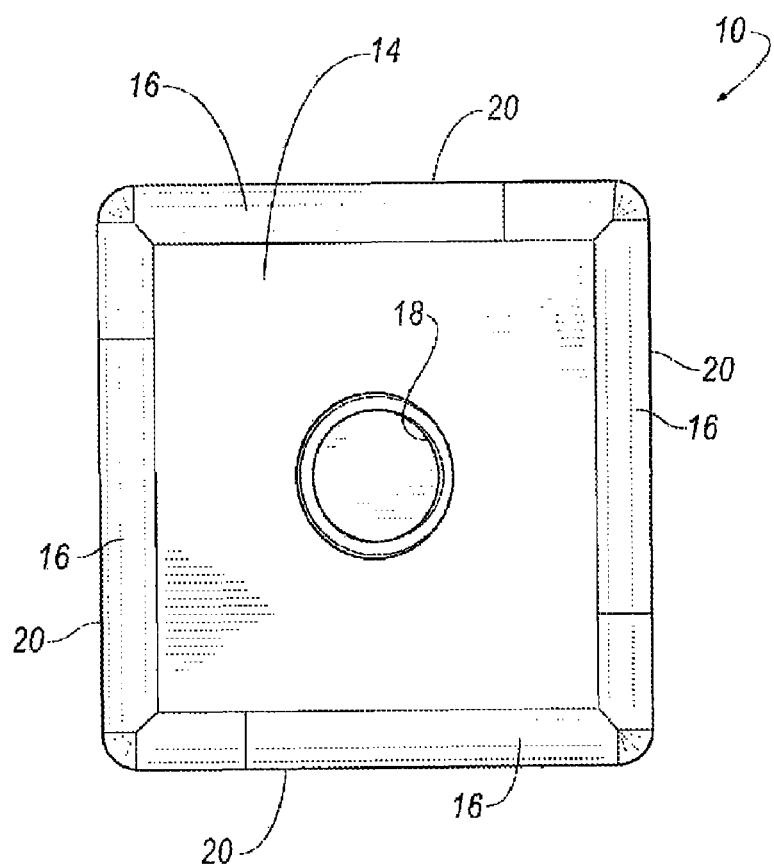
FIG. 3 is a bottom view of the cutting insert of FIG. 1.

Referring now to FIGS. 1-4, a replaceable and indexable cutting insert according to an embodiment of the invention is shown generally at 10. The cutting insert 10 includes a top surface 12, a bottom surface 14 and a plurality of clearance side surfaces 16. A threaded hole 18 extends from the bottom surface 14 of the cutting insert 10. As used herein, a "hole" is defined as a hollow place in a solid body; a cavity. The threaded hole 18 is capable of accommodating a means for fastening the cutting insert 10 to a cutter body, for example, an insert screw, as described below. A cutting edge 22 is defined by the intersection of the top surface 12 and each of the side surfaces 16. In the illustrated embodiment, the cutting insert 10 is indexable and is substantially square in shape having four clearance sides 16 and four cutting edges 22 for use in a cutting tool. However, it will be appreciated that the invention is not limited by the shape of the cutting insert, and that the invention can be practiced with cutting inserts having other polygonal shapes, such as rectangular, triangular, and the like.

The side clearance surfaces 16 may be formed at an angle 17 with respect to a central axis (z-axis) 19 of the cutting insert 10. For example, the side clearance surfaces 16 may be formed at an angle 17 of about fifteen (15) degrees with respect to the central axis 19. It will be appreciated that the invention is not limited by the angle 17, and that the invention can be practiced with any desirable angle to provide a proper amount of clearance for the cutting insert 10. For example, the angle 17 can be in the range of about zero (0) degrees to about twenty-five (25) degrees.

Figure 4:
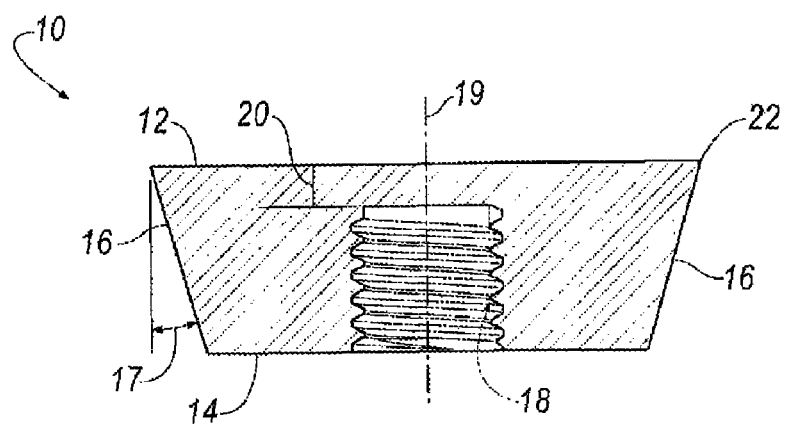
FIG. 4 is cross-sectional view of the cutting insert taken along line 4-4 of FIG. 2.

In one aspect of the invention, the threaded hole 18 does not extend completely through the cutting insert 10. That is, the threaded hole 18 does not extend entirely from the bottom surface 14 to the top surface 12. Instead, the threaded hole 18 extends from the bottom surface 14 to a predetermined distance 20 from the top surface 12, as seen in FIG. 4. In this manner, the entire top surface 12 of the cutting insert 10 has a substantially continuous surface to improve chip flow, as compared to a conventional insert in which the head of an insert screw that is disposed within a bore that extends entirely through the cutting insert may interfere with chip flow. In the illustrated embodiment, the threaded hole 18 is substantially cylindrical in shape and has a substantially uniform diameter. However, the threaded hole 18 may have a non-uniform diameter.

In the illustrated embodiment, the centerline of the threaded hole 18 is substantially parallel with the central axis 19 of the cutting insert 10. However, it will be appreciated that the threaded hole 18 may be formed at an angle with respect to the centerline axis 19 of the cutting insert 10. For example, the threaded hole 18 may be formed at an angle such that the cutting insert 10 would be drawn downward and toward the rear of the tool holder body when secured to the tool holder body.

Figure 5:
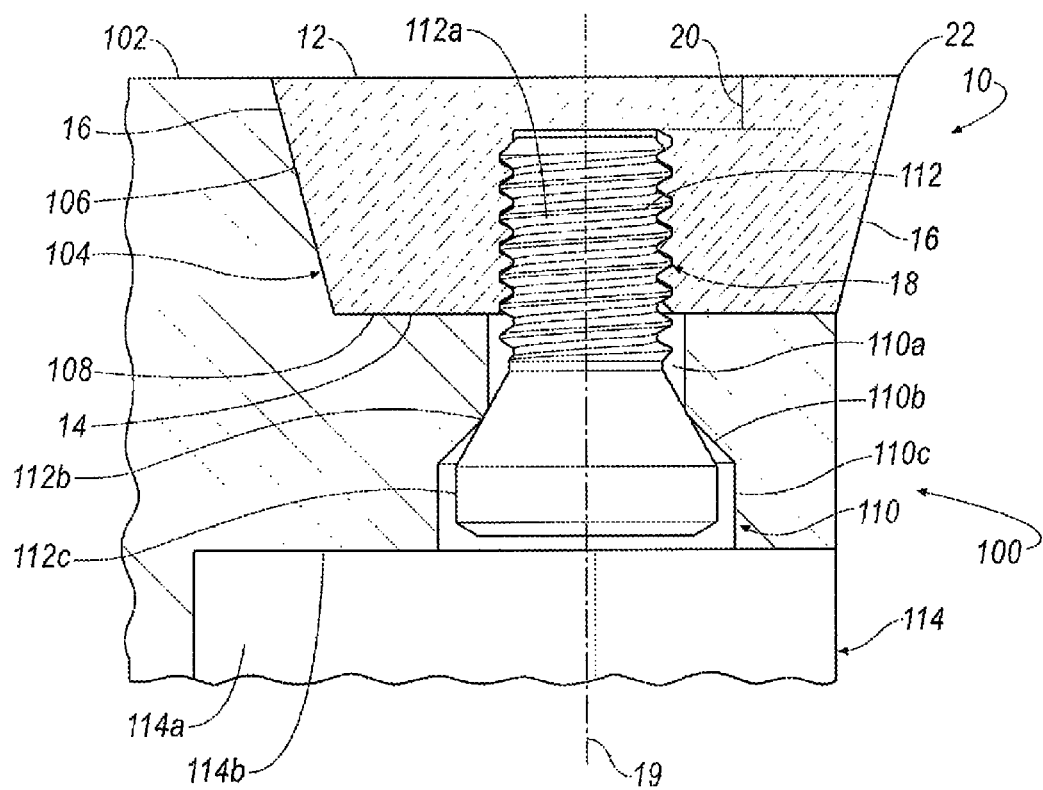
FIG. 5 is a cutaway side view of the cutting insert of FIGS. 1-4 when mounted on a cutting tool according to an embodiment of the invention.
Figure 6:
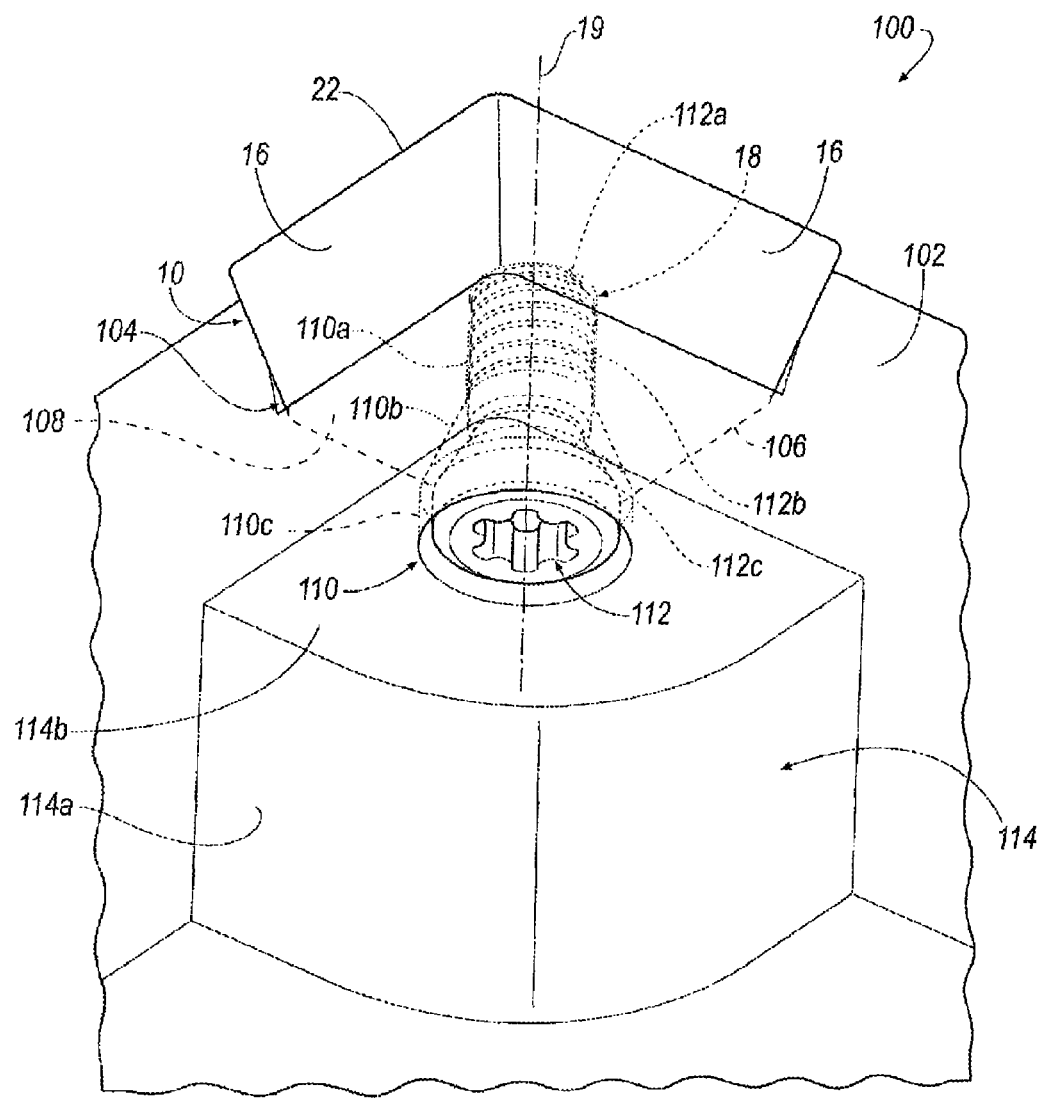
FIG. 6 is a bottom perspective view of the cutting insert of FIGS. 1-4 when mounted on the cutting tool.
Figure 7:
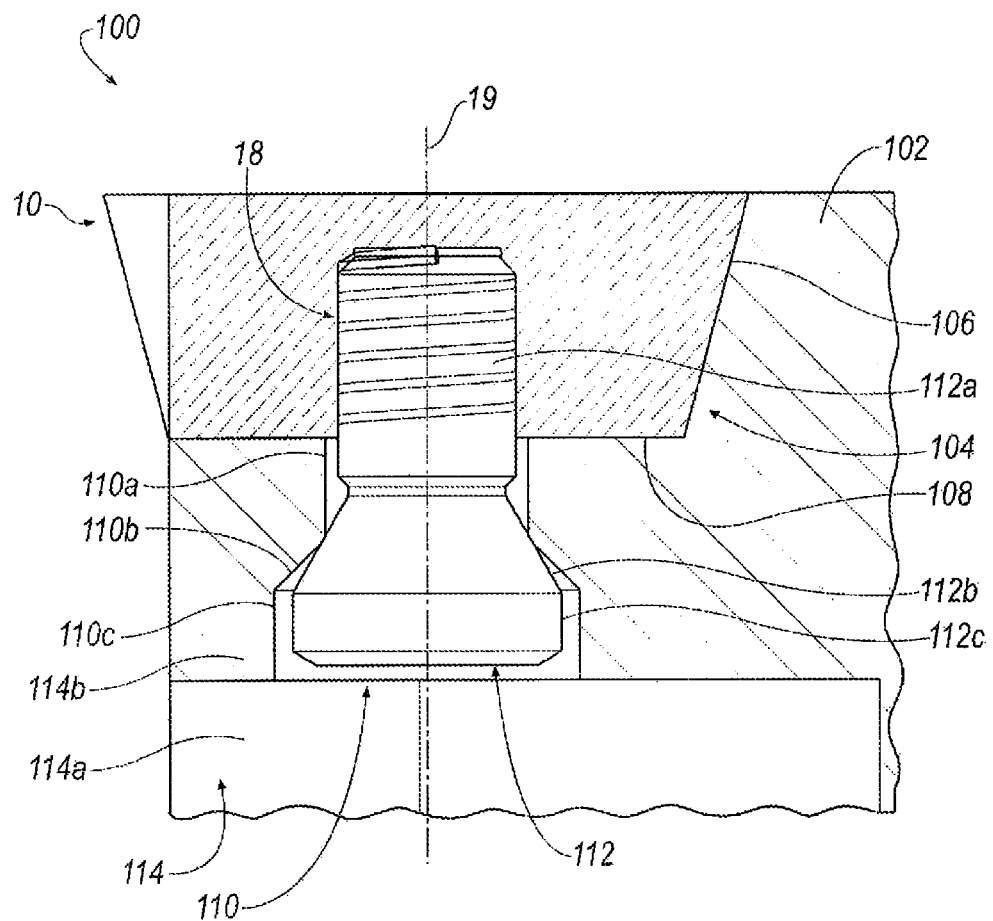
FIG. 7 is a side view of the cutting insert of FIGS. 1-4 when mounted on the cutting tool.

Referring now to FIGS. 5-7, the cutting insert 10 can be securely mounted to a cutting tool, shown generally at 100. In general, the cutting tool 100 includes a cutter body 102 and an insert-receiving pocket 104 for securing mounting the cutting insert 10 to the cutting tool 100. The insert-receiving pocket 104 includes one or more side walls 106, for example, two side walls 106 and a bottom wall 108. A mounting bore, shown generally at 110, extends from the bottom wall 108 of the insert-receiving pocket 104 for accommodating an insert screw, shown generally at 112. The insert screw 112 includes a threaded portion 112a, and angled portion 112b and a head portion 112c. It will be appreciated that the insert screw 112 does not need to have the illustrated shape, and that the invention can be practiced with, for example, a head cap screw, or any other shape that lends itself to ease of manufacture. In another example, the angled portion 112b may be omitted.

In the illustrated embodiment, the mounting bore 110 includes a first portion 110a that is substantially cylindrical in shape and has a substantially uniform diameter. The diameter of the first portion 110a is slightly larger than the diameter of the threaded portion 112a of the insert screw 112. It is possible that the first portion 110a may be threaded and may have approximately the same diameter as the threaded portion 112a of the insert screw 112 such that the insert screw 112 can be threaded into the first portion 110a. The mounting bore 110 also includes an angled portion 110b and a relatively larger diameter third portion 110c. It should be understood that the angled portion 110b may be omitted in the case where the angled portion 112b of the insert screw 112 is also omitted.

In the illustrated embodiment, the angled portion 110b of the insert screw 110 is formed at an angle with respect to the central axis 19 of the cutting insert 10 that is greater than the angle of the angled portion 112b of the insert screw 112 such that the angled portion 112b of the insert screw 112 makes point contact at the intersection of the first portion 110a and the angled portion 110b of the mounting bore 100. As seen in FIG. 5, when the cutting insert 10 is properly positioned in the insert pocket 104, the central axis of the mounting bore 110 and the central axis 19 of the cutting insert 10 are substantially aligned, thereby allowing the insert screw 110 to be threadingly received in both the threaded hole 18 of the cutting insert 10 and the mounting bore 110 of the cutter body 102.

The cutter body 102 also includes a relief 114 to allow tool access to the head portion 112c of the insert screw 112. The relief 114 includes a curved side wall 114a and a substantially planar top wall 114b. In the illustrated embodiment, the mounting bore 110 is formed in the top wall 114b of the relief 114. The insert screw 112 can be rotated by the tool (not shown) in either a clockwise or counterclockwise direction to mount and dismount the cutting insert 10 from the cutter body 102. It will be appreciated that the invention is not limited by the illustrated structure of the relief 114, and that the invention can be practiced with any means for allowing tool access to the head portion 112c. For example, tool access may be provided by forming a cylindrical aperture in the cutter body.

As described above, a cutting insert with a threaded hole that extends from the bottom surface of the cutting insert, but does not extend entirely to the top surface is described. The insert screw is threaded from the bottom of the cutting insert, rather than from the top of the cutting insert as in conventional inserts, to eliminate the possibility that the head of the insert screw could interfere with chip flow.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting insert having a central axis, comprising:
   a top surface;
   a bottom surface;
   a plurality of clearance side surfaces extending between the top and bottom surfaces;
   a cutting edge formed at an intersection between the top surface and at least one of the plurality of clearance side surfaces; and
   a threaded hole extending from the bottom surface to a predetermined distance from the top surface,
   wherein the cutting insert is secured to an insert-receiving pocket of a cutter body by passing an insert screw through a mounting bore of the cutter body and threading the insert screw in the threaded hole of the cutting insert.

2. A cutting insert according to claim 1, wherein the threaded hole is substantially aligned with the central axis of the cutting insert.

3. A cutting insert according to claim 1, wherein the cutting insert comprises a plurality of cutting edges.

4. A cutting insert according to claim 3, wherein the cutting insert is indexable.

5. A cutting insert according to claim 1, wherein the cutter body includes a mounting bore, and wherein the insert screw includes an angled portion that contacts the mounting bore when the cutting insert is mounted to the cutter body.

6. A cutting insert according to claim 1, wherein the cutter body includes a relief for allowing access to the insert screw.

7. A cutting tool comprising a cutter body having an insert-receiving pocket for receiving a cutting insert; the cutting insert comprising a top surface, a bottom surface, a plurality of clearance side surfaces, a cutting edge formed at an intersection between the top surface and at least one of the plurality of clearance side surfaces, and a threaded hole extending from the bottom surface to a predetermined distance from the top surface, wherein the cutting insert is secured to the insert-receiving pocket of the cutter body by passing an insert screw through a mounting bore of the cutter body and threading the insert screw in the threaded hole of the cutting insert.

8. A cutting tool according to claim 7, wherein the threaded hole is substantially aligned with a central axis of the cutting insert.

9. A cutting tool insert according to claim 7, wherein the cutting insert comprises a plurality of cutting edges.

10. A cutting tool according to claim 9, wherein the cutting insert is indexable.

11. A cutting tool according to claim 7, wherein the cutter body further includes a mounting bore, and wherein the insert screw includes an angled portion that contacts the mounting bore when the cutting insert is mounted to the cutter body.

12. A cutting tool according to claim 7, wherein the cutter body further includes a relief for allowing access to the insert screw.

* * * * *